United States Patent [19]

Klinchuch

[11] Patent Number: 4,631,463
[45] Date of Patent: Dec. 23, 1986

[54] LINEAR CONTROLLER FOR ELECTROCHEMICAL DEVICE AND METHOD

[75] Inventor: John F. Klinchuch, Orange, Calif.

[73] Assignee: Rockwell International Corporation, El Segundo, Calif.

[21] Appl. No.: 701,892

[22] Filed: Feb. 14, 1985

[51] Int. Cl.[4] .............................................. H02P 7/00
[52] U.S. Cl. ................................... 318/558; 318/46; 318/599; 318/811; 310/136; 310/229
[58] Field of Search ............... 310/127, 136, 148, 229, 310/230; 318/46, 811, 599, 439, 519, 558

[56] References Cited

U.S. PATENT DOCUMENTS

| 2,986,687 | 5/1961 | Mohan | 318/519 X |
| 3,184,627 | 5/1965 | Sears | 310/127 X |
| 3,895,273 | 7/1975 | Parker | 310/230 X |

FOREIGN PATENT DOCUMENTS 2445644  8/1980  France ................................. 310/230

*Primary Examiner*—William M. Shoop, Jr.
*Assistant Examiner*—Bentsu Ro
*Attorney, Agent, or Firm*—H. Fredrick Hamann; S. Alfred Uchizono

[57] ABSTRACT

An apparatus for and method of generating and linearly controlling periodic bipolar drive signals to drive an electromechanical device, such as a DC motor. The apparatus comprises side-by-side coaxial primary and secondary cylindrical commutators electrically connected together by a pair of diametrically opposed motor-driven brushes riding on the exterior surface of the commutators, each commutator having matched half-cylinder conductive sections separated by insulation at the common joints. The rotational position of the secondary commutator is adjustable relative to the primary commutator by a stepper motor mechanically coupled to it. A DC source is connected across the primary commutator and the electromechanical load is connected across the secondary commutator. Power of adjustable polarity duty cycle is commutated from the DC source to the load by the pair of rotating brushes. The relative duty cycle of positive going portion relative to negative going portion of the bipolar signal is controlled by causing the stepper motor to adjust the rotational position of the secondary commutator relative to the primary commutator.

9 Claims, 12 Drawing Figures

LINEAR CONTROLLER FOR ELECTROCHEMICAL DEVICE AND METHOD

This invention was made with Government support under Contract No. F04704-84-C-0061 awarded by the Air Force. The Government has certain rights in this invention.

This invention is related to the invention of the application entitled TURBINE-DRIVEN LINEAR CONTROLLER FOR ELECTROMECHANICAL DEVICE AND METHOD by the inventor of the present invention, John F. Klinchuch.

BACKGROUND OF THE INVENTION

1. Field of the Invention

The present invention relates to an apparatus for generating and linearly controlling periodic bipolar drive signals to drive an electromechanical device, such as an electromechanical actuator system driven by a DC motor. A method for generating and linearly controlling periodic bipolar drive signals to drive such electromechanical devices is also described.

In the field of missile actuators which are used to move control surfaces or nozzles on missiles, electromechanical actuators have heretofore not been competitive with other types of actuators such as fluidic actuators (for more than 0.5 horsepower) because of the weight associated with the electronic controllers which are used to drive the electromechanical actuators. In general, electromechanical actuators require high power electronic controllers to meet the missile requirements. Typically, missile actuator systems and their associated electronics must be nuclear hardened. Heretofore, existing hardened electronic controllers have been low power types. The high power controllers are either too heavy, or are not adequately hardened to nuclear radiation. Because the electromechanical actuator is relatively light weight, availability of high powered, nuclear hardened, relatively light weight controllers to drive such electromechanical actuators would make the electromechanical actuator a competitive candidate for the typical missile application.

SUMMARY OF THE INVENTION

It is therefore the object of the present invention to provide a nuclear hardened, relatively light weight controller to enable the use of electromechanical actuators, which actuator lends itself to lower overall lift-off weight for missile actuator systems.

It is a further object of this invention to provide a linearly pulse-width modulated motor drive with a low power controller requirement.

It is a further object of this invention to provide an apparatus which can be modified to drive more than one actuator by straight forward modification of the basic concept.

The controller for the present invention is an apparatus for generating and linearly controlling periodic bipolar drive signals from a DC power source such as a battery or power supply, to drive an electromechanical device, such as a DC motor which in turn is used as the thrust generating mechanism in the missile actuator The apparatus comprises primary and secondary commutators, both of which have two sections insulated from each other These sections are cylindrically shaped typically, where the primary commutator is connected to the DC power source, and the secondary commutator is connected to the load, which in this case is the DC motor used to drive the actuator The primary and secondary commutators are insulated from each other Electrical connection between the primary and secondary commutators is provided by a pair of diametrically opposed conductive brushes which ride on the exterior surface of the conductive portions of the primary and secondary commutators. As the brushes rotate on and about the primary and secondary surfaces, power from the DC power source is periodically commutated to the load by the brushes, at a frequency corresponding to twice the rotational frequency of the tandem brushes The signal applied to the load is a periodic bipolar drive signal which has a duty cycle linearly related to the relative positions of the primary and secondary commutators The primary and secondary commutators are supported on a base with the secondary commutator being adjustable in its rotational position by a means for providing such adjustment. In a specific embodiment, the means for adjusting the position of the secondary commutator is a stepper motor controlled by a stepper motor controller, the output of the stepper motor being coupled through gearing or otherwise to rotate and hold the secondary commutator in a desired position. Also, the first and second sections of the primary commutator and the third and fourth sections of the secondary commutator can be half cylinders which together define a cylindrical primary and secondary commutator respectively. The outer diameter of the secondary commutator is matched to the outer diameter of the primary commutator in order to facilitate good brush to commutator contact.

One approach to insulatively support and rotate the pair of brushes in contact with the primary and secondary commutators is to use a holder in the shape of a hollow cylinder concentrically attached to one end of the cylinder is an annular plate adapted for gear drive rotation. Bearings attached to the base are used to support the cylinder for free rotational motion about the axis of the cylinder. The cylinder has longitudinal interior slots for holding the brushes. The brushes are held in compressive contact with the commutator surfaces by a plurality of springs compressed between the floor of the slots and the back of each of the brushes. Also provided is a motor attached to the base having an output shaft adapted to engage and rotate the cylindrical cup and the brushes mounted in the slots attached thereto.

Also described is a method of generating and linearly controlling a bipolar signal to drive an electromechanical device, using the apparatus described above.

DESCRIPTION OF THE PREFERRED EMBODIMENT

Figure 1:
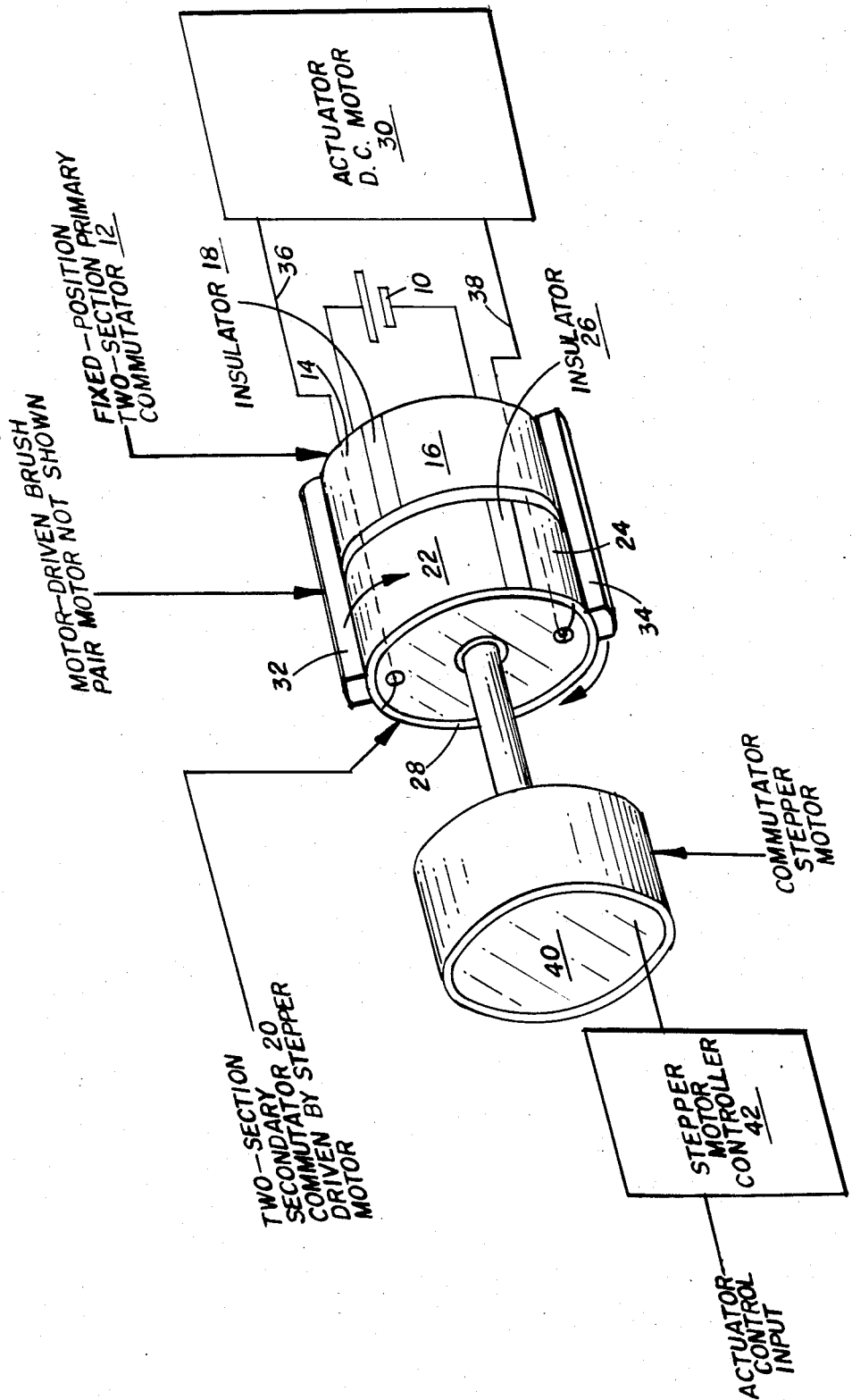
FIG. 1 is a block diagram showing a typical application of the present invention.

In FIG. 1, a typical application of the present invention in block diagram form is shown. An actuator power source represented by a battery 10 is shown connected to a fixed position, two section, primary commutator 12 having first and second sections 14, 16, separated by an insulator 18. A diametrically opposed second insulator separating the opposite edges of the two sections 14, 16 is not visible. Coaxial with the primary commutator 12 is a secondary commutator 20 which has third and fourth sections 22, 24 separated by insulators 26 and 28. Power from actuator power source 10 is commutated to the load, in this case actuator DC motor 30, via a pair of motor driven conductive brushes, 32 and 34. The commutator exterior surfaces are conductive such that the current flows from the positive terminal of power source 10 to the first commutator section 14 through brush 32 to commutator 22, and then over lead 36 to actuator DC motor 30. The return is over lead 38 to secondary commutator section 24, through brush 34 back to primary commutator section 16, and then back to the negative terminal of actuator power source 10. The brush pair 32, 34 is motor driven (motor not shown) such that for each revolution of the motor driven brush pair 32 and 34, the current which is applied to actuator DC motor 30 has gone through two complete bipolar signal periods. The duty cycle of the bipolar signal applied to actuator DC motor 30 is determined by the angular position of adjustable commutator sections 22 and 24 relative to fixed sections 14 and 16 of the primary commutator. The angular position is adjusted through the use of a stepper motor 40 which in turn is controlled by a stepper motor controller 42. The input to stepper motor controller 42 corresponds to the desired mechanical action of the actuator.

Figure 2:
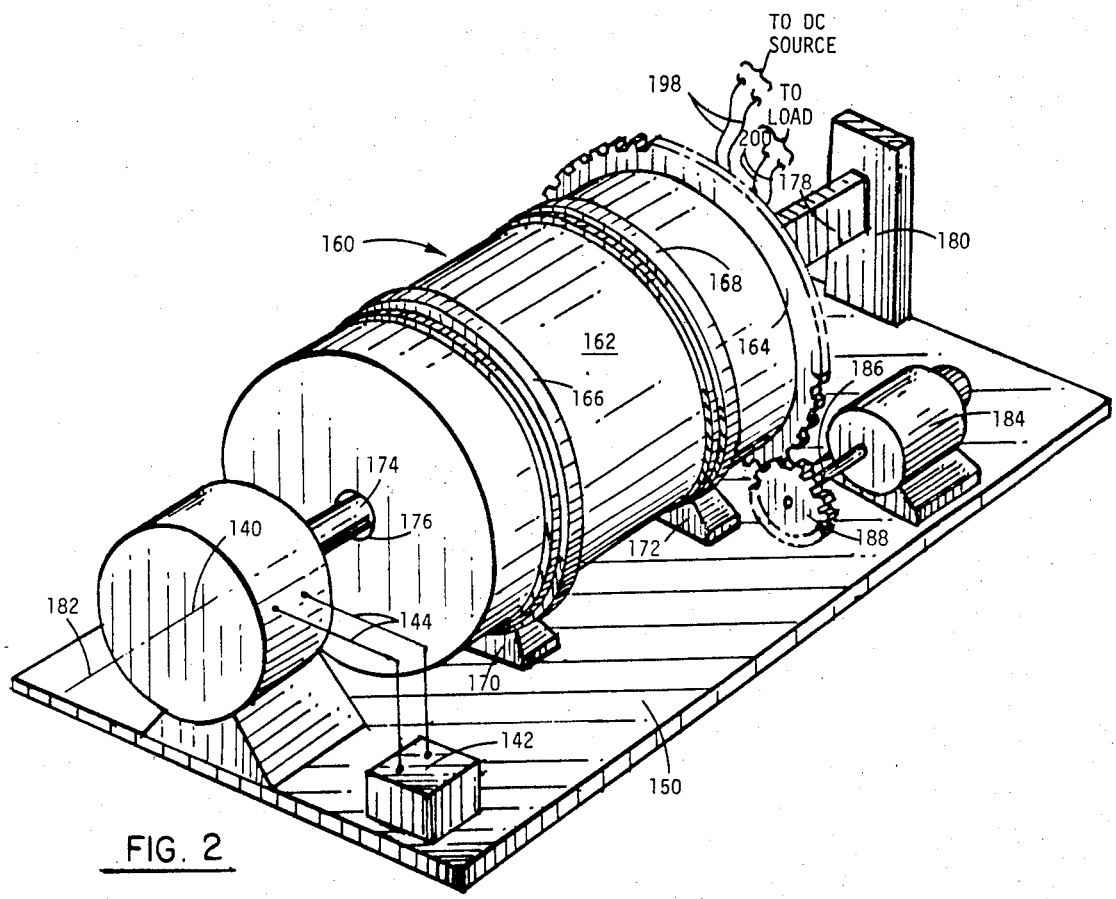
Figure 2 is a drawing in elevation of the present invention.
Figure 4:
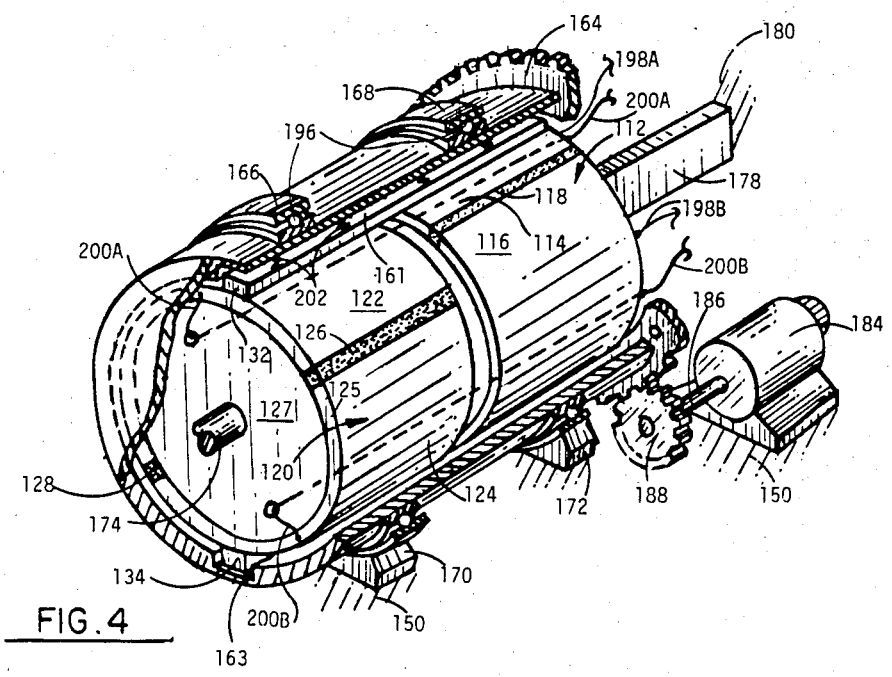
FIG. 4 is a sectional view of the drawing of FIG. 3 taken along lines 4—4 shown partially in elevation.
Figure 3:
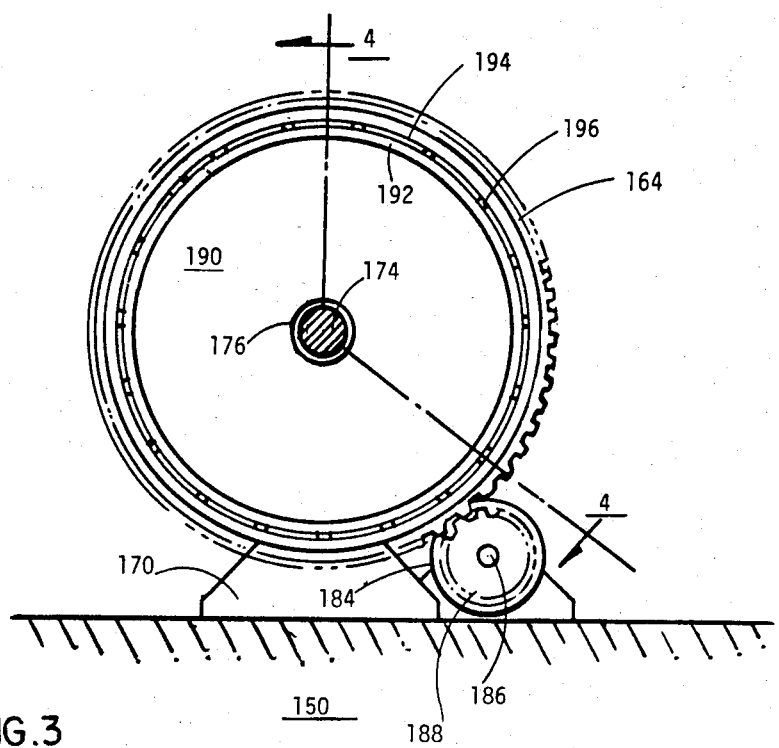
FIG. 3 is an end view of the apparatus of FIG. 2 with stepper motor removed.

In FIGS. 2, 3, and 4, there is shown a specific embodiment of the present invention such as would be used in the application of FIG. 1. In FIG. 2, stepper motor 140 is mounted to a base 150. Stepper motor 140 is controlled by a stepper motor controller 142 over leads 144. Housing assembly 160 serves as a holder for brushes comprising a cylindrical housing 162 which has a geared end plate 164. Two bearings 166, 168 are shown supporting housing 162 at supports 170, 172, which supports in turn are attached to base 150. Also shown is a shaft 174 which extends from stepper motor 140 into housing 162 through an aperture 176 at the stepper motor end of the housing. At the opposite end there is shown a structural support, comprising members 178 and 180, which is attached to the base 150 and which supports a primary commutator (not shown) internal to housing 162. Housing 162 is driven rotationally by a motor 184 which has a shaft 186 to which is attached gear 188, which in turn is engaged with geared end plate 164 attached to cylindrical housing 162. Housing 162 rotates freely within bearings 166 and 168. Lead pairs 198 and 200 connect to the DC power source and the electromechanical load (both not shown), respectively.

FIG. 3 is an end view of FIG. 2 with stepper motor removed The central hatched area 174 corresponds to a shaft connecting stepper motor 140. An end cover plate 190 of the housing 162 is shown with aperture 176 therein through which a portion of the end of a commutator 120 is visible. Bearing 166 (FIG. 2) has an inner race 192 (FIG. 3) which is attached to the housing 162 and an outer race 194 which is attached to the base support 170, which support in turn is attached to the base 150. In between the outer and inner race are bearings 196 (partially hidden) circumferentially distributed. Beyond the outer race is seen a portion of the end plate 164 on the outer edge of which are gear teeth which engage gear 188 attached to shaft 186 which shaft is driven by the motor 184 which in turn is attached to and supported by the base 150.

Turning to FIG. 4, a sectional view shown partially in elevation along the lines 4 and 4' of FIG. 3 is presented. In this view, additional details of primary and secondary commutators 112, 120 are shown. Secondary commutator 120 is comprised of a pair of conductive half cylinders 122 and 124. Insulators 126 and 128 are shown at the junction between commutator half sections 122 and 124. Supporting the half cylinders 122, 124 and insulators 126, 128 is an insulative support 125. Attached to the insulative support 125 is disk shaped plate 127. Centrally attached to the disk plate 127 is shaft 174 extending outwardly to stepper motor 140 (see FIG. 2).

Similar to the secondary commutator configuration is a primary commutator configuration 112. Primary commutator 112 is comprised of two half cylinder sections 114, 116 which are separated by an insulator 118 at one joint. Also not shown is another insulator at the other joined edges of commutator sections 114 and 116, together with insulator 118 forming a pair of insulators similar to the pair of insulators 126 and 128 used in secondary commutator 120. Primary commutator 112 is shown supported by a fixed structure comprising a horizontal member 178 and a vertical member 180, wherein vertical member 180 is attached to base plate 150. The other end of cross member 178 is attached to an end plate (not shown) similar to end plate 127 on the secondary commutator 120. Note that primary and secondary commutators 112, 120 are spaced apart such that no direct electrical connection is made between the sections of these two commutators.

What electrical connection is made between the commutators is provided through conductive brushes 132 and 134. In the FIG. 4, secondary section 122 is electrically connected to primary section 114 through brush 132. This provides a continuous electrical path from lead 200A through commutator 122, through brush 132, through section 114, through lead 198A which goes to the DC power source (not shown). Lead 200A at the other end goes to the electromechanical load, typically a DC motor such as 30 in FIG. 1 which is an integral part of the electromechanical actuator. Also shown is a lead 200B which is connected to secondary section 124 which in turn is connected to the primary commutator section 116 via brush 134, and from section 116 to the DC power source over lead 198B which is connected to primary section 116. As shown in FIG. 1, the actuator power source is a DC source connected across leads 198A and 198B. If now brush pair 132 and 134 is rotated about the commutator axis 182 of FIG. 2, while maintaining contact with the commutator exterior surfaces, the signal which appears across leads 200A and 200B will periodically alternate polarities as the brush comes into contact with a different pair of sections.

The rotation of brushes 132, 134 in contact with the commutator surfaces is facilitated by the cylindrical housing 162 which has a pair of longitudinal slots 161, 163 in which brushes are insulatively retained. Additionally, the back surface of the brushes are spring loaded against the floor of the longitudinal slots 161, 163 such that the brushes are pushed against the surfaces of the commutator. With the brushes in a loaded position, springs 202 are compressed, forcing the surface of the brush against the surface of commutators 112 and 120. Cylindrical housing 162 is supported relatively free of rotational constraints by bearings 166 and 168. Brushes 132, 134 are caused to rotate by rotation of cylindrical housing 162. The cylindrical housing is rotationally driven by motor 184, shaft 186, and gear 188, which gear engages the gear teeth on annular end plate 164.

FIGS. 5a through 5h show schematic diagrams and accompanying waveforms for the implementation of the apparatus shown in FIGS. 1 through 4. The numbering scheme corresponds to that which is used in FIGS. 2 through 4. The DC power source is represented by the battery E. The primary commutator 112 is represented by an inner broken circle, and the secondary commutator 120 is represented by an outer broken circle. The break in the inner circle at 117 and 118 represents insulation between the two primary half cylinder sections 114, 116 of FIG. 4. The breaks in the outer circle 126, 128 represent the insulation between two cylindrical half sections 122, 124 of the secondary commutator 120 of FIG. 4. Sections 122, 124 of the secondary commutator are connected to the load 30 over leads 200A and 200B.

Figure 5A:
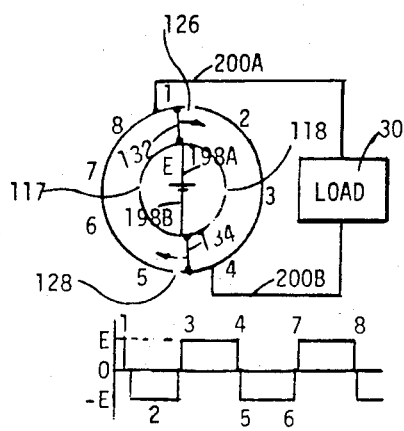
FIG. 5a through 5h are schematic diagrams of the embodiment of the present invention for various positions of the secondary commutator relative to the primary commutator.
Figure 5B:
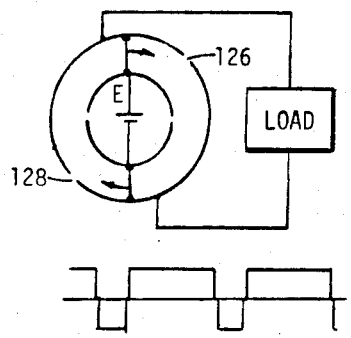

The signal waveform which is shown below each schematic is typical of the bipolar voltage signal which is supplied to the load 30 as the brushes 132 and 134 are caused to make one complete rotation about the surfaces of the primary and secondary commutators. The numbers on the waveform correspond to the position of the brush 132 as it rotates about the commutator surfaces. Where the position of the insulators 126 and 128 are shown displaced 90° from the position of the insulation on the primary 117, 118, the signal delivered to the load 30 is a symmetrical bipolar signal as shown at the bottom of FIG. 5a. Also, note that as the brushes 132, 134 make one complete revolution about the commutator, the output signal to the load 30 progresses through two complete bipolar cycles. In FIGS. 5b through 5h, the position of the secondary commutator and consequently the insulation 126 and 128 are shown rotated to other positions relative to the fixed position of the primary insulation 117, 118 on the primary commutator. The resultant output signal to the load 30 for each of these other positions of the secondary commutator is shown in the waveform at the bottom of each of the figures.

Figure 5C:
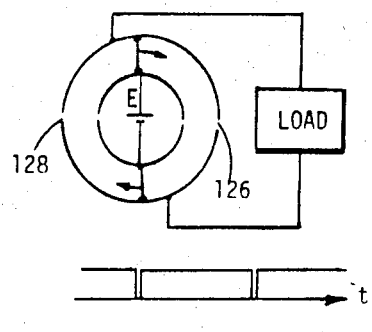
Figure 5D:
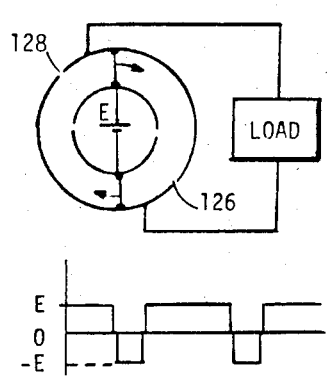
Figure 5E:
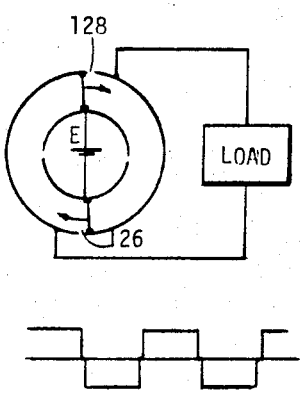
Figure 5F:
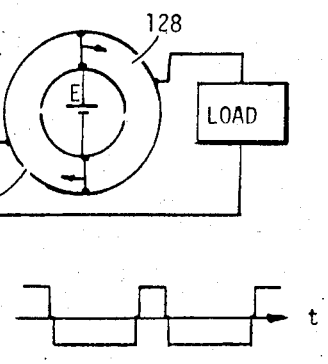
Figure 5G:
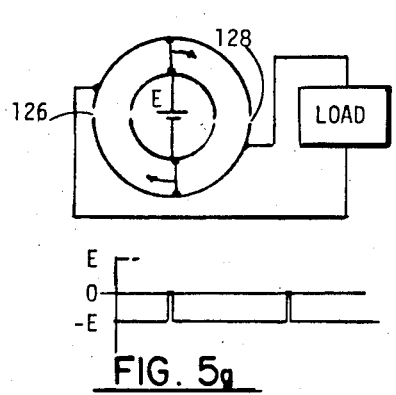
Figure 5H:
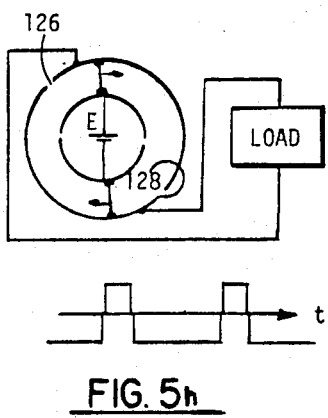

Therefore, by appropriate adjustment of the position of the secondary commutator relative to the primary commutator, the duty cycle of the polarized signal and, consequently, the polarized average signal delivered to the load 30 can be controlled. If the load is a DC type of electromechanical device, such as a DC motor, then the average polarized signal will manifest itself as a desired DC signal achieving the desired electromechanical output. It is seen from the comparison of FIGS. 5c and 5g, that a complete reversal of the polarity of the average current is substantially achieved by adjusting the position of the secondary commutator relative to the primary commutator to extreme rotational positions. In FIG. 5c, the signal appears as a substantially positive signal at the +E level. In FIG. 5g, the output signal to the load appears as a substantially negative signal at the −E level.

Another embodiment of the present invention concerns a method of generating and linearly controlling a bipolar signal to drive an electromechanical device, such as a DC motor, using apparatus of the type described above with reference to FIGS. 1-5. With reference to FIG. 1, the first step of this method is providing first and second matching half-cylinder sections 14, 16 separated by insulation 18 (and another strip not visible in the figure), together defining a fixed cylindrical primary commutator 12. The next step is providing third and fourth matching conductive half-cylinder sections 22, 24 separated by insulation 26, 28 together defining a cylindrical adjustable secondary commutator 20. This is followed by the steps of holding a pair of fixed diametrically opposed conductive brushes 32, 34 simultaneously against both cylindrical commutators 12, 20, and applying power from a DC source, such as battery 10, connected across the first and second sections 14, 16 of the primary commutator 12. The remaining steps are connecting the third and fourth sections 22, 24 of the secondary commutator 20 across the electromechanical device, such as the actuator DC motor 30, followed by alternately commutating polarized signals, such as are shown in FIGS. 5a–5h to the DC motor 30 by rotating the pair of brushes 32, 34 concentrically about the commutators 12, 20, and further followed by adjusting the relative rotational position of the secondary commutator 20 relative to the primary commutator 12, thereby causing the duty cycle of opposing polarities to change to the desired average current of the respective polarities delivered to the DC motor.

As would be apparent to one skilled in the art, other ordering of steps in the invention can be made without altering the basic utility and novelty of the present invention.

Although the invention has been described and illustrated in detail, it is clearly to be understood that the same is by way of illustration only and is not to be taken by way of limitation, the spirit and scope of this invention being limited by the terms of the appended claims.

What is claimed is:

1. An apparatus for generating and linearly controlling periodic bipolar drive signals from a DC power source having supply voltage and reference terminals to drive an electromechanical device, said apparatus comprising:

a base;
  a primary commutator having conductive first and second sections insulated from each other connected to said supply voltage and reference terminals, respectively;
  a secondary commutator adjustable in rotational position coaxial with said primary commutator having conductive third and fourth sections insulated from each other, said electromechanical device connected between said third and fourth sections;
  means attached to said base insulatively supporting said primary commutator;
  a pair of diametrically opposed conductive brushes, each brush for electrically connecting one section of said primary commutator to one positionally related section of said secondary commutator;
  means attached to said base for insulatively supporting and rotating at a given fixed rate said pair of brushes in electrical contact with said sections of said primary and secondary commutators; and
  means for insulatively supporting and adjustably setting the rotational position of said secondary commutator relative to said primary commutator to linearly control the periodic bipolar drive signal applied to said electromechanical device corresponding to said rotational position of said secondary commutator as said pair of brushes rotates simultaneously about said primary and secondary commutators.

2. The apparatus according to claim 1, wherein:
said first and second sections together define a cylindrical primary commutator; and
said third and fourth sections together define a cylindrical secondary commutator having a cross-sectional outer diameter matched to said primary commutator to facilitate brush to commutator contact.

3. The apparatus according to claim 1, wherein said means insulatively supporting said primary commutator comprises a rigid structural member attached to said base and supportively attached to said primary commutator.

4. The apparatus according to claim 1, wherein said means for insulatively supporting and rotating said pair of brushes comprises:
a hollow cylinder having first and second ends and a centered axis of rotation about which said cylinder rotates;
an annular end plate adapted for gear drive rotation concentrically attached to said first end of said hollow cylinder;
bearing means attached to said base for supporting said cylinder freely of rotational motion of said cylinder;
said cylinder having longitudinal interior slots for holding said brushes;
a plurality of springs compressed between the floor of said slots and the back of each of said brushes for pushing on said brushes to maintain mechanical contact between said brushes and said commutators; and
a motor attached to said base having an output shaft adapted to engage and rotate said annular end plate and said cylinder and brushes attached thereto.

5. The apparatus according to claim 1, wherein said means for insulatively supporting and adjustably setting the rotational position of said secondary commutator comprises:
a stepper motor attached to said base having a stepwise adjustable output shaft to which said secondary commutator is coaxially attached; and
a stepper motor controller for converting input command signals to stepper motor control signals.

6. The apparatus according to claim 5, wherein said means for insulatively supporting and rotating said pair of brushes comprises:
a hollow cylinder having first and second ends and a centered axis of rotation about which said cylinder rotates;
an annular end plate adapted for gear drive rotation concentrically attached to said first end of said hollow cylinder;
bearing means attached to said base for supporting said cylinder freely of rotational motion of said cylinder;
said cylinder having longitudinal interior slots for holding said brushes;
a plurality of springs compressed between the floor of said slots and the back of each of said brushes for pushing on said brushes to maintain mechanical contact between said brushes and said commutators;
a motor attached to said base having an output shaft adapted to engage and rotate said annular end plate and said cylinder and brushes attached thereto.

7. The apparatus according to claim 6, wherein said means insulatively supporting said primary commutator comprises a rigid structural member attached to said base and supportively attached to said primary commutator.

8. The apparatus according to claim 7, wherein:
said first and second sections together define a cylindrical primary commutator; and
said third and fourth sections together define a cylindrical secondary commutator having a cross-sectional outer diameter matched to said primary commutator to facilitate brush to commutator contact.

9. A method of generating and linearly controlling a bipolar signal to drive an electromechanical device, including the steps of:
providing first and second matching conductive half-cylinder sections separated by insulation together defining a cylindrical fixed primary commutator;
providing third and fourth matching conductive half-cylinder sections separated by insulation together defining a cylindrical adjustable secondary commutator;
holding a pair of fixed diametrically opposed conductive brushes simultaneously against both said commutators;
applying power from a DC source connected across said first and second sections of said primary commutator;
connecting said third and fourth sections of said secondary commutator across said electromechanical device;
alternately commutating polarized signals to the electromechanical device by rotating said pair of brushes concentrically about said commutators;
adjusting the relative rotational position of said secondary commutator relative to said primary commutator thereby causing the duty cycle of opposing polarities to change to the desired average current of the respective polarities delivered to said electromechanical device.

* * * * *

UNITED STATES PATENT AND TRADEMARK OFFICE
CERTIFICATE OF CORRECTION

PATENT NO. : 4,631,463

DATED : December 23, 1986

INVENTOR(S) : John F. Klinchuch

It is certified that error appears in the above-identified patent and that said Letters Patent is hereby corrected as shown below:

On the cover page, in the title, "ELECTROCHEMICAL" should read --ELECTROMECHANICAL--.

Column 1, line 2, "ELECTROCHEMICAL" should read --ELECTROMECHANICAL--.

Column 2, line 58, "Fi9ure" should read -- Fig.--.

A period (.) should be place at the end of 6 sentences as follows:

Column 1, lines 63 and 66

Column 2, lines 2, 3, 13 and 17.

Signed and Sealed this

Fourteenth Day of April, 1987

Attest:

DONALD J. QUIGG

Attesting Officer

Commissioner of Patents and Trademarks